(12) United States Patent
Asao et al.

(10) Patent No.: US 7,176,659 B2
(45) Date of Patent: Feb. 13, 2007

(54) VEHICLE ELECTRICAL POWER SUPPLY SYSTEM FOR SUPPLYING POWER TO A HIGH POWER LOAD

(75) Inventors: Yoshihito Asao, Tokyo (JP); Hirofumi Watanabe, Tokyo (JP); Katsumi Adachi, Tokyo (JP); Shirou Iwatani, Tokyo (JP); Kyoji Matsumura, Tokyo (JP); Tuneji Goda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1108 days.

(21) Appl. No.: 09/813,348

(22) Filed: Mar. 21, 2001

(65) Prior Publication Data

US 2002/0027425 A1 Mar. 7, 2002

(30) Foreign Application Priority Data

Sep. 6, 2000 (JP) ............................... 2000-270398

(51) Int. Cl.
*H02H 7/06* (2006.01)
*H02P 11/00* (2006.01)
*H02P 9/00* (2006.01)

(52) U.S. Cl. ....................................................... 322/28
(58) Field of Classification Search .................. 322/28, 322/89, 90
See application file for complete search history.

(56) References Cited

U.S. PATENT DOCUMENTS

| | | | | |
|---|---|---|---|---|
| 5,093,583 A * | 3/1992 | Mashino et al. | ............ | 307/10.1 |
| 5,231,344 A * | 7/1993 | Marumoto et al. | ............ | 322/14 |
| 5,280,231 A * | 1/1994 | Kato et al. | ...................... | 320/31 |
| 5,418,401 A * | 5/1995 | Kaneyuki | ................... | 307/10.1 |
| 5,483,146 A | 1/1996 | Schultz et al. | | |
| 5,499,178 A * | 3/1996 | Mohan | ......................... | 363/39 |
| 5,552,681 A * | 9/1996 | Suzuki et al. | ............... | 318/139 |
| 5,606,244 A * | 2/1997 | Migdal | .......................... | 322/7 |
| 5,663,631 A * | 9/1997 | Kajiura et al. | ................. | 322/29 |
| 5,681,495 A * | 10/1997 | Tsuchiya et al. | ............ | 219/506 |
| 5,719,484 A * | 2/1998 | Taniguchi et al. | ............ | 322/20 |
| 5,726,559 A * | 3/1998 | Taniguchi et al. | ............ | 322/34 |
| 5,731,681 A * | 3/1998 | Inaniwa et al. | ............. | 318/729 |
| 5,930,134 A * | 7/1999 | Glennon | ..................... | 318/431 |
| 6,184,661 B1 * | 2/2001 | Becker et al. | ................ | 322/25 |
| 6,300,746 B1 * | 10/2001 | Mueller et al. | ............... | 322/29 |

(Continued)

FOREIGN PATENT DOCUMENTS

EP  0 881 738 A2  12/1998

(Continued)

*Primary Examiner*—Julio Gonzalez
(74) *Attorney, Agent, or Firm*—Sughrue Mion, PLLC

(57) ABSTRACT

The present invention provides an electrical power supply system for an automotive vehicle with high reliability and small size in which an adequate power is supplied to both a high power load like a blower motor and a conventional load like a battery by using a conventional alternator.

The power supply system for the automotive vehicle comprises: an alternator with an armature winding and a field coil, a stepping-up DC/DC converter for applying a stepped up voltage of a battery to the field coil, a regulator for controlling an output voltage of the alternator by changing the output voltage in response to a rotating speed for supplying a power to the high power load, and for controlling the output voltage to be a charging voltage of the battery.

10 Claims, 4 Drawing Sheets

U.S. PATENT DOCUMENTS 6,323,625 B1 * 11/2001 Bhargava .................... 322/32

FOREIGN PATENT DOCUMENTS

| JP | 1-186200 | 7/1989 |
|---|---|---|
| JP | 1-214235 | 8/1989 |
| JP | 6-12934 | 2/1994 |
| JP | 6-178459 | 6/1994 |
| JP | 2-526667 | 6/1996 |
| JP | 2762469 | 3/1998 |
| JP | 2864887 | 12/1998 |
| KR | 10-0189692 B1 | 1/1999 |

* cited by examiner

VEHICLE ELECTRICAL POWER SUPPLY SYSTEM FOR SUPPLYING POWER TO A HIGH POWER LOAD

BACKGROUND OF THE INVENTION

1. Technical Field

The present invention relates to an electrical power supply system and more particularly to an electrical power supply system for an automotive vehicle for supplying power to a high power load for a short time period by increasing an alternator output.

2. Background Art

Recently the number of a high power load of an automotive vehicle such as a blower motor or an ice-removing heater on a windshield is increasing. For the high power load a system is proposed, wherein a high power is extracted by using a high voltage charging alternator on the automotive vehicle.

For example, according to a Japanese Patent No.2864887, a 3-phase alternator is driven by an oil pressure pump and an oil pressure motor laden in a vehicle, and an output frequency as well as a voltage of the alternator is kept constant by keeping a constant engine rotation after the engine is started. Thereby, a high voltage of the alternator with a high generating efficiency could be applied to the high power load and a battery through a stepping-down voltage converter. In this configuration a rated output of the alternator regardless of an engine rotating speed is obtained from an idling zone, and the alternator with a small size and a light weight is capable of supplying power to a high power with high voltage load. The alternator is also able to supply the required power to a low voltage load through an AC/DC voltage converter. Furthermore, a layout freedom of the alternator driven by an oil pressure is not limited but even enlarged, as the AC/DC voltage converter operating with a constant output frequency of the alternator can be small in size and light in weight.

According to a Japanese laid open Patent No.6-12934, other effective method for supplying a power to the high power with high voltage load is disclosed. In the art a vehicle-laden alternator output voltage with the maximum output power changes in response to a rotating speed of the alternator. To drive the high power with high voltage load which is usually existing in the idling zone, the engine rotation is being increased from an idling speed for the alternator to reach the maximum power at a second voltage set value for supplying the power, and simultaneously an attained high voltage is reduced to a voltage equal to a first voltage set value by a voltage reducing means for charging the secondary battery.

In the former prior art although the stable alternator output is obtainable due to a constant speed driving, a rotating speed with the maximum output varies according to a load condition of the alternator. Moreover, obtaining a high voltage and a voltage for charging the secondary battery is incompatible, and an additional driving device like an oil pressure motor becomes required.

In the latter prior art simultaneous realization of the voltages corresponding respectively to the first and the second voltage set values is intended, but due to a limitation of the alternator size sufficient power is not always supplied to the high power with high voltage load during the operation at the maximum output voltage point, and a control system becomes complicated for controlling a load distribution.

SUMMARY OF THE INVENTION

In view of the above, it is the object of the present invention to provide an electrical power supply system for an automotive vehicle capable of supplying a required power to both a high power load and a battery.

According to this invention, an electrical power supply system for the automotive vehicle comprises:

an alternator having an armature winding and a field coil for supplying a power to both a high power load and a battery, a stepping-up DC/DC converter to step up a voltage of the battery for applying to the field coil, a voltage control means for controlling an output voltage of the alternator by controlling the current of the field coil, and a control means for increasing power of the alternator by changing the output voltage of the alternator in response to a rotating speed of the alternator when the alternator supplies power to the high power load, and for controlling the output voltage of the alternator to a battery charging voltage by regulating the voltage control means when the alternator supplies power to the battery.

The electrical power supply system for the automotive vehicle, wherein a voltage applied to the field coil is stepped up to a voltage of the battery multiplied by a factor of 1.2 to 2.0.

The electrical power supply system for the automotive vehicle, wherein the output voltage of the alternator changing in response to the rotating speed is set to be higher than the voltage of the battery.

The electrical power supply system for the automotive vehicle, wherein the output voltage of the alternator changes in response to the rotating speed detected by a rotating speed detector.

The electrical power supply system for the automotive vehicle, wherein the field current of the alternator is controlled by a detected temperature of the field coil by a temperature sensing device in the voltage control means.

The electrical power supply system for the automotive vehicle, wherein the field current of the alternator is controlled by an inferred temperature from the field current of the alternator detected by a current detecting device in the voltage control means.

The electrical power supply system for the automotive vehicle, wherein the stepping-up DC/DC converter for applying the stepped up voltage of the battery to the field coil is integrated the voltage control means.

Furthermore, according to this invention, an electrical power supply system for an automotive vehicle comprising:

an alternator having an armature winding and a field coil for supplying a power to both a high power load and a battery, a stepping-up DC/DC converter to step up a voltage of the battery for applying to the field coil, a voltage control means for controlling an output voltage of the alternator by controlling a current of the field coil, and for increasing an output of the alternator by changing the output voltage in response to a rotating speed of the alternator in a predetermined rotating speed zone, and a stepping-down DC/DC converter to step down the output voltage of the alternator to a charging voltage for the battery, and to supply power with a regulated voltage to both the battery and the high power load.

The electrical power supply system for the automotive vehicle, wherein the stepping-down DC/DC converter for supplying the power to both the high power load and the battery is integrated with the voltage control means.

The electrical power supply system for the automotive vehicle, wherein an output voltage of the stepping-down DC/DC converter has a negative gradient temperature characteristics.

As described above in the present invention, the alternator output is increased by stepping up the field voltage. And also the maximum alternator output is obtained by controlling the output voltage to change responding to the rotating speed of the alternator. Moreover, the alternator output is controlled by detecting the temperature. Therefore, the conventional type alternator is applicable for supplying adequate power to both the high power load and the battery. In addition, the stable maximum output power of the alternator during idling up operation of the internal combustion engine is obtainable as the output voltage is subjected to the rotating speed of the alternator. Furthermore, the reliable, inexpensive and small-sized power supply system is realized by avoiding sophistication of a control system,

DETAILED DESCRIPTION OF THE PREFERRED EMBODIMENTS

Figure 1:
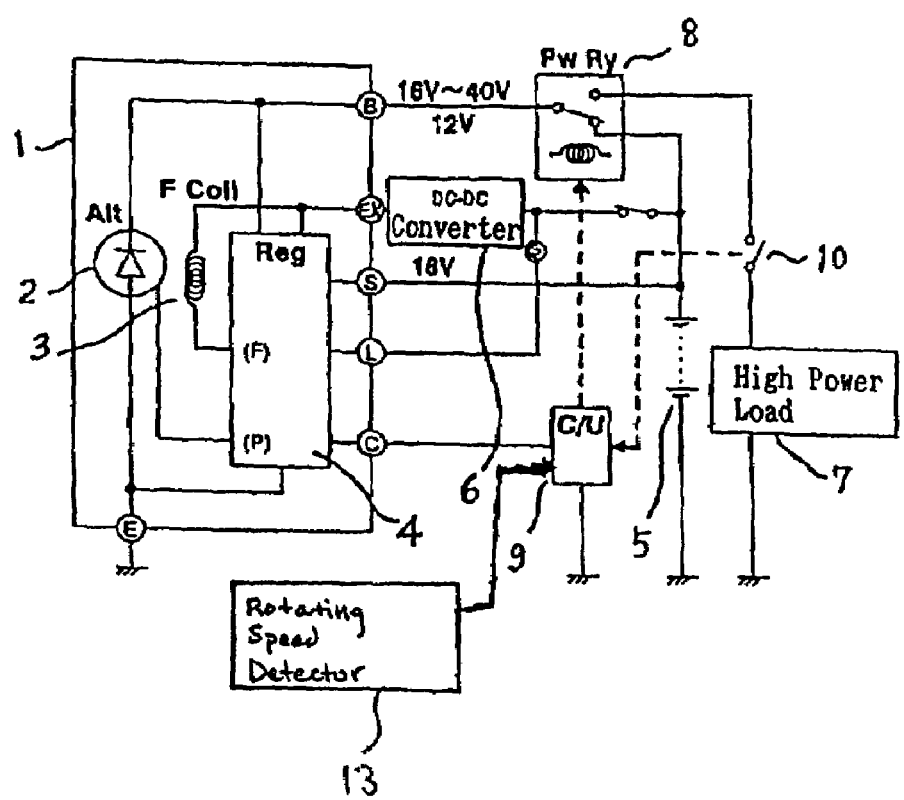
FIG. 1 is a schematic diagram of a power supply system for an automotive vehicle according to an embodiment 1 of the present invention.
Figure 2:
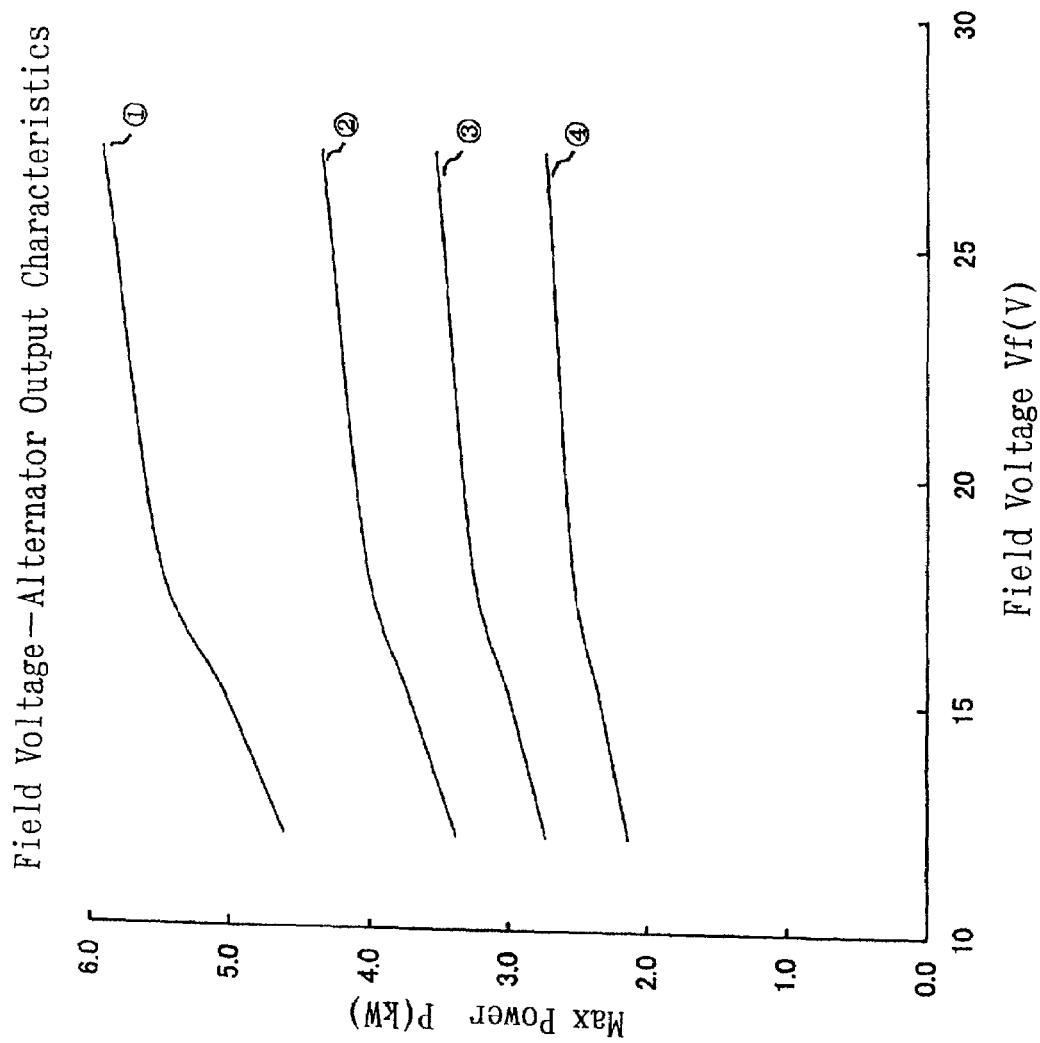
FIG. 2 is a graph representing characteristics of the power supply system for the automotive vehicle for explaining operation in the embodiment 1 of the present invention.
Figure 3:
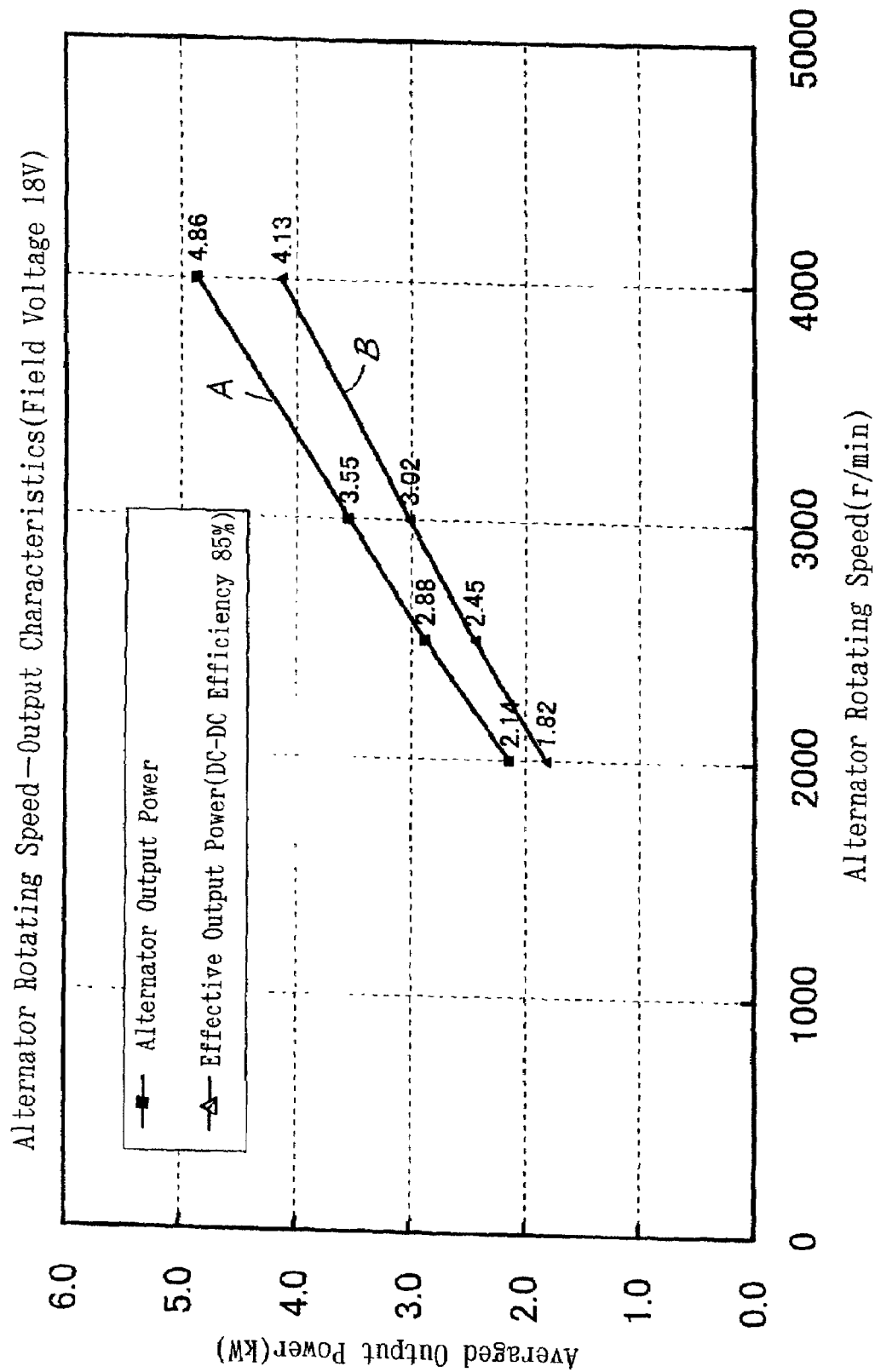
FIG. 3 is a graph representing characteristics of the power supply system for the automotive vehicle for explaining operation in the embodiment 1 of the present invention.

FIG. 1 is a circuit diagram of an electrical power supply system according to an embodiment 1 of the present invention. FIG. 2 is a graph representing output characteristics of an alternator for a field voltage of a 3-phase alternator on a vehicle according to the present invention. FIG. 3 is a graph representing output characteristics of the alternator for a rotating speed according to the present invention in case a field current is set to a predetermined value.

In FIG. 1 the alternator is, for example, a 3-phase alternator 1 on a vehicle comprising an armature constructive assembly 2 including an armature winding for generating a 3-phase AC power and a 3-phase full wave rectifier for rectifying the 3-phase AC power, a field coil 3 for providing a magnetic flux to the armature winding, and a regulator 4 as a voltage control means for controlling a field current of the field coil 3. A battery 5 is a vehicle-laden secondary battery. A stepping-up DC/DC converter 6 is for stepping up a voltage of a battery 5 to apply to the field coil 3, and the battery 5 is charged by the 3-phase alternator 1 for supplying a power to a load except for a high power load 7 for a short time period.

The high power load 7 is a load such as a blower motor or a windshield heater driven directly by a high voltage of the 3-phase alternator 1. A power relay 8 switches a power supplied from the 3-phase alternator 1 to the battery 5 for charging or to the high power load 7. A control unit 9 detects a on/off state of a switch 10 for supplying power to the battery 5 for charging or to the high power load 7. Moreover, the control unit 9 is configured to command the regulator 4, whereby an output voltage of the 3-phase alternator 1 is switched to a low charging voltage for the battery 5 or a high voltage for the high power load 7. In addition, the control unit 9 is configured such that a voltage applied to the high power load is made to correspond to a detected rotating speed of the 3-phase alternator 1 detected by a rotating speed detector 13, and that an output of the 3-phase alternator 1 is suppressed by detecting a temperature of the field coil 3.

FIG. 2 is a graph representing characteristics of an output power P for a field voltage Vf applied to the field coil 3 of the 3-phase alternator 1 used in general, and is more particularly the maximum output characteristics, wherein the output voltage is set so that a maximum output voltage is obtained for each rotating speed. In FIG. 2, a curve ① shows characteristics at the condition where the rotating speed is 4,000 rpm and the output voltage is 40V, a curve ② shows characteristics at a condition where the rotating speed is 3,000 rpm and the output voltage is 30V. Similarly, a curve ③ and a curve ④ respectively show characteristics at the condition of 2,500 rpm with 25V and 2,000 rpm with 20V. In this FIG. 2, the maximum output power P of the 3-phase alternator 1 increases as the field voltage Vf is increased if the rotating speed is assumed to be constant, and the output power is saturated when the field voltage Vf is increased to a certain value. In case of the 3-phase alternator 1 which is usually vehicle-laden, the field voltage is approximately 12V of the voltage of the battery 5. But as shown in FIG. 2, it is more effective for the field voltage to be set higher than the voltage of the battery 5 for increasing the maximum output.

On the other hand, there is a limitation in an increase of the field voltage Vf due to saturation characteristics of the output power and a temperature rise. Therefore, the field voltage is effectively obtained by stepping up the battery voltage by a factor of 1.2 to 2.0. Thus, the adequate output for driving the high power load 7 for a short time period is obtainable, and the 3-phase alternator 1 can resist a short time temperature rise of the field coil 3. Therefore, the stepping-up DC/DC converter 6 in FIG. 1 is configured to step up the voltage of the battery 5 to a voltage of the battery 5 multiplied by a factor of 1.2 to 2.0 for applying to the field coil 3, but in an example hereafter explained 18V of the field voltage Vf in case the factor 1.5 is used.

FIG. 3 is a graph representing characteristics of an averaged output for the rotating speed in case the field voltage Vf of the 3-phase alternator 1 being kept to a fixed value of 18V. In FIG. 3, a curve A shows characteristics of the alternator output power in KW, and a curve B shows a characteristics of the effective output power in KW in case the conversion efficiency of the DC/DC converter is 85%. As shown in this FIG. 3, although the averaged output of the 3-phase alternator 1 increases responding to an increase of the rotating speed, the maximum output of the 3-phase alternator 1 at each rotating speed is determined by the output voltage and the output voltage for obtaining the maximum output increases according to a rise of the rotating speed as is easily understood from the prior art of the Japanese laid open Patent No. 6-12934 and FIG. 2. Therefore, the maximum output of the 3-phase alternator 1 is always obtainable by changing the output voltage in response to the changing rotating speed. The output voltage differs according to a specification of the alternator, wherein the output voltage usually is higher than the voltage of the battery 5 above an idling zone of an internal combustion engine.

In the embodiment 1 according to the present invention of the power supply system for the automotive vehicle as described above, the stepping-up DC/DC converter 6 applies 18 V of the stepped up voltage of the battery 5 to the field coil 3. The control unit 9 detects the switch 10 to became on for switching a load from the battery 5 to the high power load 7 by activating the power relay 8, and also controls the output voltage of the 3-phase alternator 1 responding to the rotating speed, for example, from 16V to 40V for obtaining the maximum output from the 3-phase alternator 1. The high power load is, for example, the load with a short time rating like the ice removing heater of the windshield, and the temperature of the field coil 3 rarely rises above a predetermined value under the maximum power operation. In this case if the temperature of the field coil 3 rises above the value due to an excessive field current, the temperature rise is suppressed by limiting the field current based on a detected temperature using the control unit 9.

When an off state of the switch 10 is detected by the control unit 9, the load is switched from the high power load 7 to the battery 5 and simultaneously a set voltage value of the regulator 4 is switched to 12V for charging the battery 5 for returning to a normal operation. Moreover, the temperature of the field coil 3 is detected indirectly by the control unit 9 as the field coil 3 is a rotor of the 3-phase alternator 1. For example a temperature sensing element built in the regulator 4 and having a predetermined heat capacity or a heat dispersing circuit equivalent to the heat capacity is used for judging the temperature which varies subject to the field current by taking a temperature correlation. Furthermore, a reason why an output voltage range is limited to be controlled from 16V to 40V in response to the rotating speed of the 3-phase alternator 1 is that an increase of the output is required only in a low rotating zone of the internal combustion engine.

As heretofore explained, in the embodiment 1 of the power supply system for the automotive vehicle according to the present invention, the output of the 3-phase alternator1 is increased by increasing a magnetic force of the field coil 3 by stepping up the field current. In this way the maximum output power of the 3-phase alternator 1 is obtained by controlling the output voltage subject to the rotating speed. Therefore, the high power load 7 is capable of being operated only for the short time period, and no problem arises even when a power supply to the battery 5 is interrupted while the power is being supplied to the high power load 7. Thus, the adequate power can be supplied to each load by using a conventional alternator as the 3-phase alternator 1 without complicating the control system.

Figure 4:
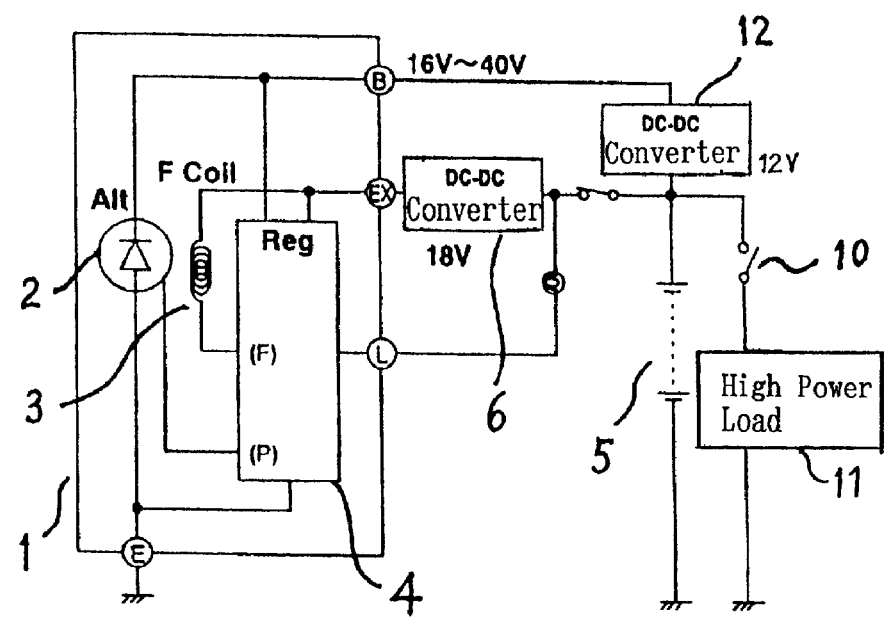
FIG. 4 is a schematic diagram of the power supply system for the automotive vehicle according to an embodiment 2 of the present invention.

FIG . 4 is a circuit diagram of the embodiment 2 of the power supply system for the automotive vehicle according to the present invention. The system in the embodiment 2 is configured, wherein the adequate power with a same voltage is supplied to both a high power load 11 and a battery 5 by increasing the output power of the 3-phase alternator 1. As shown in FIG. 4, the 3-phase alternator 1 which is vehicle-laden as in the embodiment 1 comprises the armature constructive assembly 2 including the armature winding for generating the 3-phase AC power and the 3-phase full wave rectifier, the field coil 3 for providing the magnetic flux to the armature winding, and the regulator 4 as the voltage control unit for controlling the field current of the field coil 3.

The battery 5 is the vehicle-laden secondary battery. The stepping-up DC/DC converter 6 is for converting the voltage of the battery 5 to apply to the field coil 3, the high power load 11 is a load such as the blower motor or the windshield heater, the switch 10 is for supplying the power to the high power load 11, a stepping-down DC/DC converter 12 is for stepping down the output voltage of the 3-phase alternator 1 to apply to both the battery 5 and the high power load 11. In the embodiment 2 the power for the high power load 11 is supplied from both the 3-phase alternator 1 and the battery 5.

In the power supply system for the automotive vehicle as explained in the embodiment 2, the field voltage, for example, of 18V which is stepped up by the stepping-up DC/DC converter 6 as in the embodiment 1 is applied to the field coil 3 of the 3-phase alternator 1, whereby the output is increased and the voltage with the maximum output of the 3-phase alternator 1 responding to the rotating speed in a predetermined rotating speed zone is obtained. For example the output voltage from 16V to 40V is obtained in response to the rotating speed.

The stepping-down DC/DC converter 12 steps down the above voltage with the maximum output to a charging voltage of 12V for supplying the power to the high power load 11 as well as the battery 5 to be charged. The stepping-up DC/DC converter 6 and the stepping-down DC/DC converter 12 can be small-sized by integrating with the regulator 4. Furthermore, a temperature rise of the 3-phase alternator 1 is suppressed by the stepping-down DC/DC converter 12 having negative gradient temperature characteristics.

In FIG. 2 representing a case of the embodiment 1, both the averaged output of the 3-phase alternator 1 and the output are shown in case a conversion efficiency of the stepping-down DC/DC converter 12 is 85%. And even taking into consideration the above conversion efficiency of 85% of the stepping-down DC/DC converter 12, the high power of the 3-phase alternator 1 is obtainable by stepping up the field voltage Vf and by setting the output voltage in response to the rotating speed. Therefore, the adequate power is capable of being supplied to both the high power load 11 driven in the low rotating speed zone and the battery 5. In addition, a conventional operation is quite the same with an operation of the present invention in that when the idling up operation is initiated by energizing the switch 10 to on state, the rotating speed of the internal combustion engine and the 3-phase alternator 1 is increased accordingly.

What is claimed is:

1. An electrical power supply system for an automotive vehicle comprising:
   an alternator having an armature winding and a field coil for supplying a power to both a high power load and a battery,
   a stepping-up DC/DC converter for stepping up a voltage of said battery for applying a stepping-up voltage to said field coil,
   a voltage control means for controlling an output voltage of said alternator by controlling a current of said field coil, and
   a control means for increasing power of said alternator by changing said output voltage of said alternator in response to a rotating speed of said alternator when said alternator supplies power to said high power load, and for controlling said output voltage of said alternator to a battery charging voltage by regulating said voltage control means when said alternator supplies power to said battery.

2. The electrical power supply system for the automotive vehicle according to claim 1, wherein a voltage applied to said field coil is stepped up to a voltage of the battery multiplied by a factor of 1.2 to 2.0.

3. The electrical power supply system for the automotive vehicle according to claim 1, wherein said output voltage of said alternator which changes in response to said rotating speed is set to be higher than said voltage of said battery.

4. The electrical power supply system for the automotive vehicle according to claim 1, wherein said output voltage of said alternator changes in response to said rotating speed detected by a rotating speed detector.

5. The electrical power supply system for the automotive vehicle according to claim 1, wherein said voltage control means controls said current of said field coil based on a detected temperature of said field coil.

6. The electrical power supply system for the automotive vehicle according to claim 1, wherein said voltage control means controls said current of said field coil based on a temperature of said field coil inferred from said field current of said field coil.

7. The electrical power supply system for the automotive vehicle according to claim 1, wherein said stepping-up DC/DC converter for applying said stepped up voltage of said battery to said field coil is integrated with said voltage control means.

8. An electrical power supply system for an automotive vehicle comprising:
   an alternator having an armature winding and a field coil for supplying a power to both a high power load and a battery,
   an alternator having an armature winding and a field coil for supplying a power to both a high power load and a battery,
   a stepping-up DC/DC converter for stepping up a voltage of said battery and applying a stepped-up voltage to said field coil
   a voltage control means for controlling an output voltage of said alternator by controlling a current of said field coil, and for increasing an output of said alternator by changing said output voltage in response to a rotating speed of said alternator in a predetermined rotating speed zone, and
   a stepping-down DC/DC converter to step down said output voltage of said alternator to a charging voltage for said battery, and to supply power with a regulated voltage to both said battery and said high power load.

9. The electrical power supply system for the automotive vehicle according to claim 8, wherein said stepping down DC/DC converter for supplying said power to both said high power load and said battery is integrated with said voltage control means.

10. The electrical power supply system for the automotive vehicle according to claim 8, wherein an output voltage of said stepping-down DC/DC converter has negative gradient temperature characteristics for suppressing a temperature rise of said alternator.

* * * * *